United States Patent
Dayalan et al.

(10) Patent No.: US 12,540,748 B2
(45) Date of Patent: Feb. 3, 2026

(54) SYSTEM AND METHOD FOR CONTROLLING THE CONDITIONING MODE OF A CLIMATE CONTROL DEVICE

(71) Applicant: Trane International Inc., Davidson, NC (US)

(72) Inventors: Udhaya Kumar Dayalan, Lino Lakes, MN (US); James Kenneth McKeever, Blaine, MN (US); Brian A. Kirkman, Shoreview, MN (US); Eugene R. Shedivy, St. Paul, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 169 days.

(21) Appl. No.: 18/066,069

(22) Filed: Dec. 14, 2022

(65) Prior Publication Data
US 2024/0200818 A1 Jun. 20, 2024

(51) Int. Cl.
| | |
|---|---|
| F24F 11/67 | (2018.01) |
| F24F 11/32 | (2018.01) |
| F24F 11/523 | (2018.01) |
| F24F 11/64 | (2018.01) |
| F24F 11/83 | (2018.01) |
| F24F 110/10 | (2018.01) |

(52) U.S. Cl.
CPC .............. F24F 11/67 (2018.01); F24F 11/32 (2018.01); F24F 11/523 (2018.01); F24F 11/64 (2018.01); F24F 11/83 (2018.01); F24F 2110/10 (2018.01)

(58) Field of Classification Search
CPC .................................. F24F 11/67; F24F 11/32
See application file for complete search history.

(56) References Cited

U.S. PATENT DOCUMENTS

| | | | |
|---|---|---|---|
| 4,316,256 A | 2/1982 | Hendricks et al. | |
| 4,446,913 A | 5/1984 | Krocker | |

(Continued)

FOREIGN PATENT DOCUMENTS

| | | | | |
|---|---|---|---|---|
| CA | 2138114 A1 | | 7/1995 | |
| CA | 2373311 C | * | 7/2010 | .............. F24F 11/30 |
| CA | 2873592 C | | 11/2013 | |

OTHER PUBLICATIONS

Kline, Individual room hvac temperature set point device, 1999, Full Document (Year: 1999).*

Primary Examiner — Nael N Babaa
(74) Attorney, Agent, or Firm — Womble Bond Dickinson (US) LLP (57) ABSTRACT

An apparatus and method for controlling the conditioning mode of a climate control device, such as a rooftop unit, that is servicing multiple connected terminal unit. The improved process may include determining a conditioning mode error for the connected terminal units. The conditioning mode error may be an integrated error value that is based on a temperature deviation integrated over the duration of the temperature deviation. The process may also determine a cooling mode error and a heating mode error. The cooling mode error and the heating mode error may be based on the conditioning mode error for the terminal units associated with cooling conditions and heating conditions, respectively. The process may further compare the cooling mode error and the heating mode error, and it may also adjust the conditioning mode of the climate control device based on the comparison.

26 Claims, 6 Drawing Sheets

(56) References Cited

U.S. PATENT DOCUMENTS

| | | |
|---|---|---|
| 5,555,927 A | 9/1996 | Shah |
| 9,157,646 B2 | 10/2015 | Anderson et al. |
| 9,816,719 B2 | 11/2017 | Bergman et al. |
| 9,870,009 B2 | 1/2018 | Erwin et al. |
| 10,496,057 B2 | 12/2019 | Hrejsa |
| 10,592,821 B2 * | 3/2020 | Denton .................. F24F 11/63 |
| 10,971,253 B2 | 4/2021 | Gould |
| 11,333,384 B1 | 5/2022 | Karimi et al. |
| 2005/0189429 A1 | 9/2005 | Breeden |
| 2011/0153090 A1 | 6/2011 | Besore et al. |
| 2013/0261808 A1 | 10/2013 | Besore et al. |
| 2014/0039689 A1* | 2/2014 | Honda ..................... F24F 11/65 |
| | | 700/276 |
| 2014/0123685 A1 | 5/2014 | Kim et al. |
| 2016/0054019 A1 | 2/2016 | Lee et al. |
| 2016/0153674 A1 | 6/2016 | Lancaster |
| 2017/0030598 A1 | 2/2017 | Burns et al. |
| 2018/0066854 A1 | 3/2018 | Gagne et al. |
| 2019/0162436 A1* | 5/2019 | Albinger ................. F24F 11/32 |
| 2020/0141597 A1 | 5/2020 | Amundson et al. |
| 2021/0148595 A1* | 5/2021 | Heintzelman ............ F24F 11/59 |
| 2021/0310685 A1 | 10/2021 | Kanematsu et al. |
| 2022/0082323 A1 | 3/2022 | Poulsen |
| 2022/0390138 A1 | 12/2022 | Jaber et al. |
| 2023/0020824 A1 | 1/2023 | Gupta et al. |

\* cited by examiner

SYSTEM AND METHOD FOR CONTROLLING THE CONDITIONING MODE OF A CLIMATE CONTROL DEVICE

TECHNOLOGICAL FIELD

The present disclosure relates generally to an improved apparatus and method for controlling the conditioning mode of a climate control device, and is particularly applicable to climate control devices providing conditioning to multiple terminal units.

BACKGROUND

Climate control devices often service multiple conditioned spaces at a time. These conditioned spaces may have differing conditioning demands, and at times even request different types of conditioning, e.g., some request cooling while others request heating. Various techniques have been developed to address this problem. For example, the conditioned spaces may be divided into zones with various terminal units modulating the conditioning for each zone. In other instances, multiple climate control devices are utilized.

The central climate control device, however, is still only able to provide a single type of conditioning, e.g., heating or cooling, to the zones and spaces being conditioned. As a result, when various zones or spaces request different conditioning types, the central climate control device servicing these spaces is only able to provide conditioning for a subset of the zones or spaces being serviced. The remaining zones may receive no conditioning, or often the "wrong" type of conditioning. This issue may be intensified when certain zones are required to provide a minimum amount of conditioned air to satisfy an outdoor air requirement. If this minimum amount of air is providing the "wrong" type of conditioning then it may need to be conditioned again, resulting in further inefficiencies.

As a result, processes are used to determine which conditioning mode the climate control device should be set to. However, thus far the techniques have been insufficient. Existing processes often use a voting system that allows zones connected to the climate control device to provide a vote that the conditioning mode needs to change. Once sufficient votes have been provided the climate control device may switch conditioning modes.

These existing processes, however, often fail to adequately control the system. Frequently a given zone or conditioned space is left receiving the "wrong" conditioning for too long. Thus, these existing processes result in prolonged discomfort within a space and/or increased energy consumption by the climate control system. In addition, the existing processes have limited control regarding switching between conditioning modes, which causes certain climate control system to excessively switch between conditioning modes. This leads to overuse of the climate control system components and often causes maintenance issues.

Thus, there exists a need for an improved process for switching a climate control device between conditioning modes. One that addresses the varying needs of the zones while also allowing the climate control system to operate efficiently.

BRIEF SUMMARY

The present disclosure provides example apparatuses and methods for implementing an improved change over process. This improved process may be applied to a multiple-zone climate control system that includes a central climate control device, e.g., a rooftop unit, connected to multiple terminal units providing conditioning to various zone. This improved process minimizes the amount of time the climate control device operates in the "wrong" mode, and also allows for additional customization for this control.

In some examples, the improved process provides a more in-depth assessment of the request from each terminal unit for conditioning. For example, the process may determine a conditioning mode error for each terminal unit (and associated zone) by assessing the temperature deviation for that zone and the time associated with the temperature deviation. In these examples, the conditioning mode error may be an integrated error value, where the temperature deviation is integrated over the duration of time associated with the temperature deviation. Using an integrated error value may have various advantages, including more accurately accounting the conditions of conditioned space(s). In addition, by using the integrated value for some or all of the terminal units within a climate control system, the process may better assess the conditioning needs of all the spaces supported by the climate control system.

Further, in some examples, the temperature deviation may be determined using various settings, including a temperature setpoint, a deadband setting, and potentially an adjusted temperature setpoint. These additional settings may allow for a more detailed assessment of the conditioning needs for a given terminal unit.

The process discussed herein may also aggregate some or all of the conditioning mode errors. This aggregation may be used to determine a cooling mode error and a heating mode error. The process may further compare the cooling mode error to the heating mode error. Based on this comparison the process may determine the appropriate conditioning mode for the climate control device, and adjust the conditioning mode, if necessary.

Further, the examples discussed herein may include additional procedures for adjusting and/or customizing this process. For example, a weighting may be applied to adjust the conditioning mode error for terminal unit(s). In addition, the conditioning mode error associated with one or more terminal unit(s) may be excluded from the cooling mode error and/or heating mode error calculation. Other customizations may also be utilized.

The present disclosure thus includes, without limitation, the following example implementations.

Some example implementations include An apparatus for controlling a conditioning mode of a climate control device, the apparatus comprising: a memory configured to store computer-readable program code including a change-over-control-related software application; and a processor configured to access the memory, and execute the computer-readable program code to cause the apparatus to at least: determine a conditioning mode error for two or more of the plurality of terminal units, the conditioning mode error for each terminal unit being based on a temperature deviation and a duration of the temperature deviation for the respective terminal unit; determine a cooling mode error for a first set of the terminal units, the cooling mode error being based on the conditioning mode error for the terminal units associated with cooling conditions; determine a heating mode error for a second set of terminal units, the heating mode error being based on the conditioning mode error for the terminal units associated with heating conditions; compare the cooling mode error and the heating mode error; and adjust the conditioning mode of the climate control device based on the comparison of the cooling mode error and the heating mode error.

Some example implementations include a method of controlling a conditioning mode of a climate control device, the climate control device providing a conditioning fluid to a plurality of terminal units, the method comprising: determining a conditioning mode error for two or more of the plurality of terminal units, the conditioning mode error for each terminal unit being based on a temperature deviation and a duration of the temperature deviation for the respective terminal unit; determining a cooling mode error for a first set of the terminal units, the cooling mode error being based on the conditioning mode error for the terminal units request cooling; determining a heating mode error for a second set of terminal units, the heating mode error being based on the conditioning mode error for the terminal units requesting heating; comparing the cooling mode error and the heating mode error; and adjusting the conditioning mode of the climate control device based on the comparison of the cooling mode error and the heating mode error.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

The present disclosure provides apparatuses and methods for implementing an improved process for controlling the conditioning mode of a climate control system. This improved process may efficiently switch a central climate control device between heating and cooling mode. As discussed in more detail below, this process is particularly applicable to multiple-zone applications. Indeed, the examples discussed herein primarily discuss multiple-zone applications, however, these processes may also be utilized for single-zone application where there are a plurality of temperature sensors associated with a given zone, e.g., a sensor in different conditioned spaces within the zone, etc. In these single zone applications, the process may account for the different conditioning needs for each space and determine the appropriate conditioning mode accordingly.

In general, the climate control system discussed here includes a central climate control device(s) that provided conditioning to a plurality of terminal units. The central climate control device may provide conditioning in any manner, but typically provides each terminal unit with a conditioned air flow. This conditioning may be in the form of either heating or cooling, and all terminal units receive the same conditioning from the central climate control unit.

The terminal units may service one or more conditioned spaces, often referred to as a zone. The terminal units provides conditioning to these conditioned spaces based on the conditioning demands of each zone. Given the various differences between the demands in these zones, e.g., different internal or external load conditions, temperature setpoints, etc., these different zones may request different levels or types of conditioning. For example, some zones associated with a given terminal unit may request heating and other zones associated with a different terminal unit may request cooling. The examples discussed herein provide for an improved method for processing these requests to control the conditioning mode of the central climate control system based on these sometimes conflicting requests.

Figure 1:
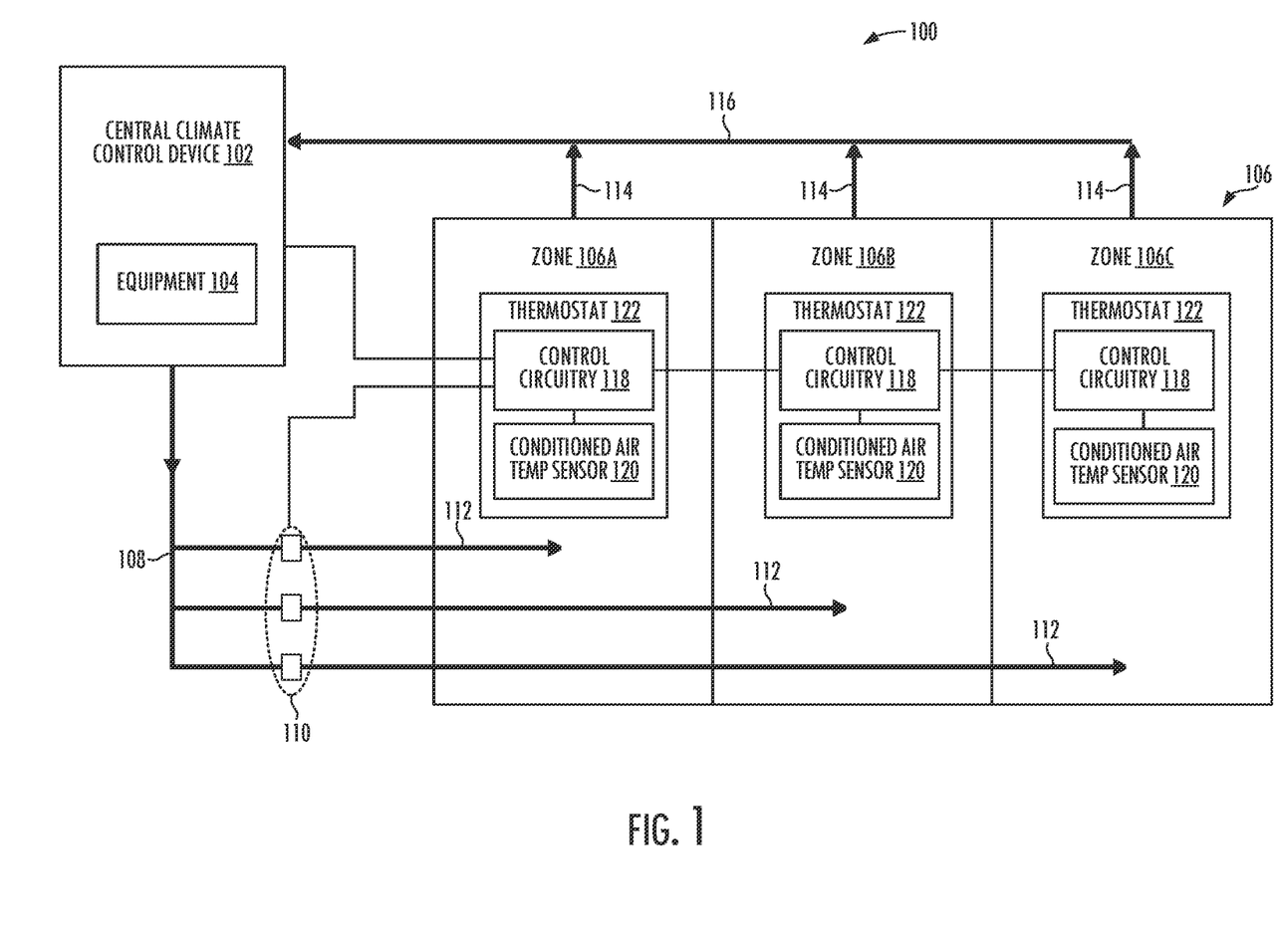
FIG. 1 is a block diagram of a climate control system according to some example implementations of the present disclosure.

Before discussing the process in greater detail, FIG. 1 is provided which shows an overview of an example climate control system 100. This figure shows a block diagram of a climate control system according to some example implementations of the present disclosure. The climate control system generally includes a central climate control device 102 with associated equipment 104. The central climate control device may provide conditioning to various conditioned space 106, which in some examples may be divided into a plurality of zones 106A, 106B, 106C (each of which may itself be a conditioned space). It will be appreciated that while three zones are shown, any number of zones may be present. It will also be appreciated that references to the conditioned zone may be equally applicable to one or more zones of the conditioned space, each of which, again, may itself be a conditioned space.

The central climate control device 102 may provide the conditioning via a conditioned fluid, typically conditioned air. The conditioning fluid may be routed by a supply path 108, typically a supply duct, to terminal units 110. These terminal units may further supply conditioning via zone supply paths 112 to the conditioned space(s). The conditioning fluid circulation path may also include a return path including zone return paths 114 and a main return path 116 operably coupleable to the central climate control device. Again, typically, these paths are a ducted path circulating conditioned air to conditioned spaces associated with the zones, and then potentially back to the central climate control device.

The central climate control device 102 may be any type of climate control unit. For example, it may be a packaged unit, a rooftop unit, a split system unit (with both an indoor and an outdoor unit), a chiller, or any other type of unit. The central climate control system in these examples may be designed to provide both heating and cooling conditioning. For example, the equipment 104 associated with the central climate control unit may include a reversible refrigerant loop, often referred to as a heat pump. These heat pump systems may circulate a refrigerant fluid between various components to transfer heat to (or from) the conditioning fluid to an outside environment. In other examples, the central climate control device may utilize different conditioning methods. For example, a refrigerant loop may be used for cooling mode to transfer heat out of the conditioned fluid (and thus out of the conditioned spaces), and a separate device is used for heating mode. This separate device may be a furnace or electric heater. Still other configurations may also be utilized.

The climate control system 100 may also use any type of terminal unit. For example, the terminal units may be a change over bypass unit, variable air volume dampers (VAVs), power induction units (PIUs), motorized dampers, or any other type of terminal unit.

The terminal units 110 may control the flow of conditioning fluid into the associated zone and conditioned spaces. These terminal units may be control based on the conditioning demands of the conditioned space, and may modulate the flow of conditioning fluid accordingly. For example, the terminal unit may receive temperature (or other conditioning) information associated with the conditioned space and adjust the flow of the conditioned fluid based on this information. Typically, each zone has a temperature setpoint and is controlled to that temperature. Based on the sensed temperature and the setpoint, the terminal unit will adjust the flow of conditioning to the conditioned space, e.g., if the sensed temperature is above the temperature setpoint the terminal unit will direct more conditioned fluid to the space and vice versa.

Often a terminal unit 110 is only able to provide the conditioning supplied to it by the central climate control unit 102. For example, if the central climate control unit is in cooling mode providing cold air, then the terminal unit may only provide cooling to the associated zones. In these examples, the terminal unit may only adjust the amount of conditioning provide to the zone from the central climate control unit, but not the type of conditioning provided. In some examples, the terminal unit has additional conditioning capacity, typically heating capacity. In these examples, the terminal unit may independently provide conditioning in a different mode than provided by the central climate control unit. However, in these examples, the system may operate inefficiently because there may be some level of "double" conditioning. For example, the terminal unit may be required to heat cold air (or cool hot air) because the conditioning requested by the terminal unit it different from the conditioning supplied by the central climate control device.

The climate control system 100 may also include control circuitry 118 operably coupled to the climate control equipment, e.g., the central climate control device 102 and the terminal units 110. The control circuitry may be configured to control this equipment to provide conditioned fluid to heat or cool the conditioned space 106, or in some examples, zones 106A, 106B, 106C of the conditioned space. In some examples, the control circuitry is configured to control the climate control equipment based on environmental feedback from one or more sensors operably coupled to the control circuitry. In this regard, the climate control system may include at least one temperature sensor, and typically at least one temperature sensor in each zone, and the control circuitry may be configured to control the climate control equipment to provide the conditioned air based on observations of measured temperature so that zone temperature is maintained at or near its setpoint temperature.

For example, the climate control system 100 may include a conditioned air temperature sensor 120 in the conditioned spaces 106 configured to measure temperature in the conditioned space. In some examples, as shown, one or more of the zones 106A, 106B, 106C may include a respective conditioned air temperature sensor for the zone configured to measure temperature in the zone. In some examples, including the depicted example, the control circuitry 118 (or some portion of the control circuitry) and a conditioned air temperature sensor may be co-located in a thermostat 122. In other examples, the control circuitry and the conditioned air temperature sensor may be separated and connected by wire or wirelessly; and in some of these examples, the conditioned air temperature sensor may be co-located with other electronic devices or circuitry such as a display device, network adapter, or the like.

Figure 2:
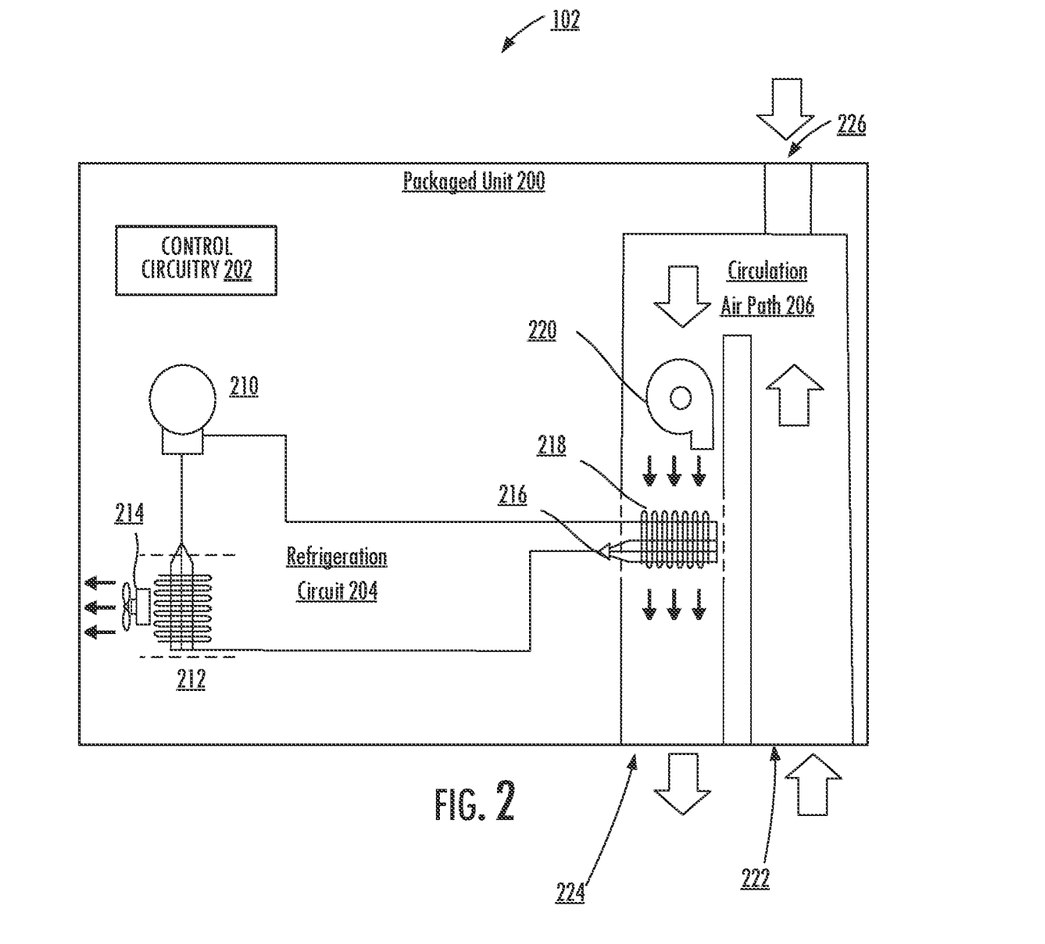
FIG. 2 is a diagram of a packaged unit, according to some example implementations of the present disclosure.

FIG. 2 shows a diagram of an example where the central climate control unit 106 is a package unit 200. The depicted package unit may include control circuitry 202, a refrigeration circuit 204, a circulation air path 206 along with potentially other features. The control circuitry may be coupled to all of the components within the packaged unit, and it may control these components, receive information for the sensors, and/or perform other functions.

The refrigeration circuit 204 may be configured to transfer thermal energy between the circulation air and a heat sink or heat source, potentially the outside environment. In the depicted example, the refrigeration circuit includes a compressor assembly 210, a first heat exchanger assembly 212, an outdoor fan 214, a metering device 216, a second heat exchanger assembly 218, and a circulation blower assembly 220. The components may be operated to compress and expand the refrigerant to transfer thermal energy between the heat exchangers and satisfy a given cooling and/or heating load. In some examples, the compressor assembly includes a plurality of compressors, and in some examples, the circulation blower assembly includes a plurality of blowers. In some examples, the refrigeration circuit includes more or less components than those shown in FIG. 2.

The circulation air path 206 may direct circulation air through the packaged unit, allowing the circulation air to transfer thermal energy to (or from) the refrigeration circuit 204 and satisfy a cooling or heating demand. In the depicted example the circulation air path includes a return air path 222, a supply air path 224, and an outside air path 226. This circulation air paths may provide conditioning air to terminal units (not shown in FIG. 2) as discussed above. In addition, FIG. 2 only shows an example of a central climate control device that may be used with the system and methods described herein. Other devices and configurations may also be utilized.

Figure 3:
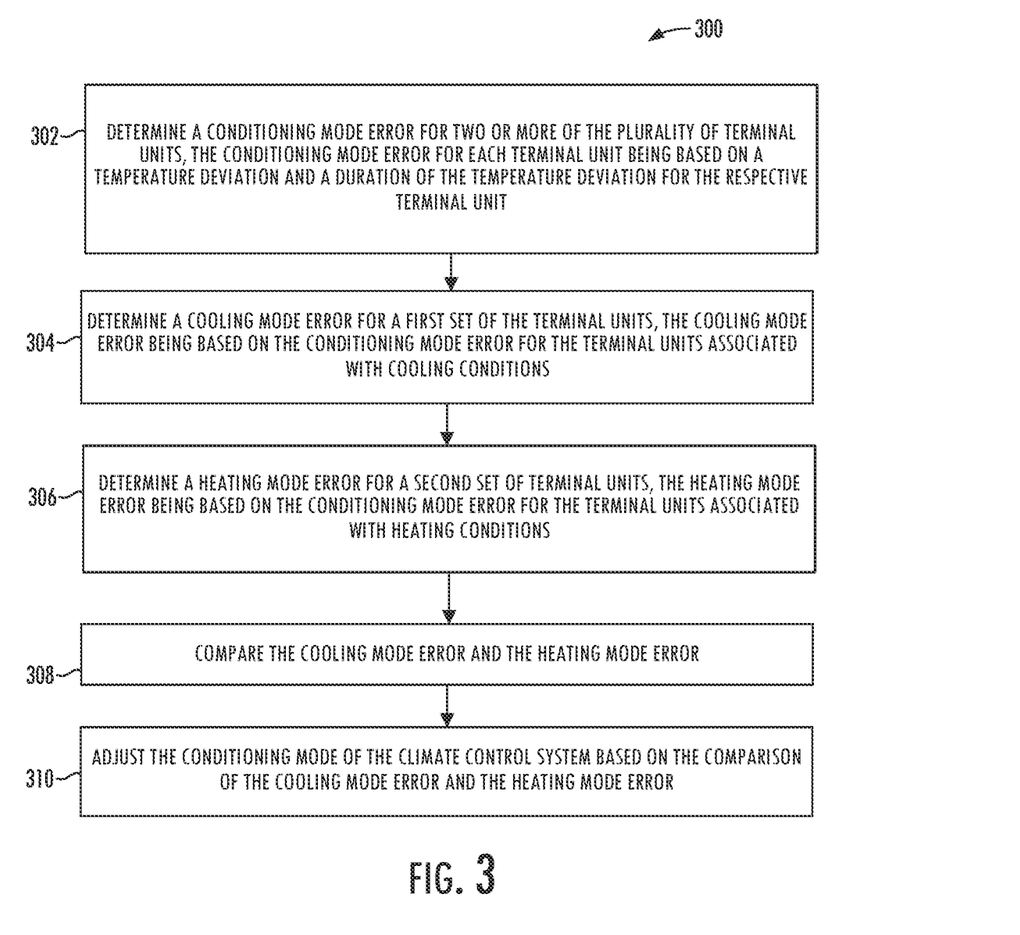
FIG. 3 is a flowchart illustrating various operations for controlling the conditioning mode of a climate control device, according to some example implementations.

Turning to the improved process, FIG. 3 provides a diagram of an example of the improved change over processes for controlling the conditioning mode for a central climate control unit. This process receives various conditioning requests from the terminal units associated with conditioned zones, and based on these requests, it operates the central climate control unit in a given conditioning mode.

In some examples, this process 300 may determine a conditioning mode error for two or more terminal units at step 302. A conditioning mode error may be determined for each terminal unit, and in some examples, the conditioning mode error may be based on both a temperature deviation and a duration of the temperature deviation for the respective terminal unit. In these examples, using both the temperature deviation and the duration may allow for improved change over performance. For example, this process may ensure the process efficiently addresses any protracted conditioning issue for a given zone associated with a terminal unit.

The process may further determine a cooling mode error at step 304 and a heating mode error at step 306. In some examples, these process steps are analogous. For example, the cooling mode error may be based on the conditioning mode error for the terminal units associated with cooling conditions. This set terminal units may be determined based on the zones requesting cooling, the conditioning mode setting for the terminal unit, the conditions of the space, or another method. In these examples, the cooling mode error may be the aggregated conditioning mode error for the set of terminal units associated with the cooling conditions. Further, the set of terminal units used to determine the cooling mode error may be some or all of the terminal units associated with cooling conditions. Further, the cooling mode error may be determined by summing the conditioning mode errors for this set of terminal units. Other methods may be used to aggregate these conditioning mode errors to determine the cooling mode error, e.g., average, weighted average, maximum error, minimum error, etc.

The heating mode error may be determined at step 306 in the same or a similar manner as discussed above in connection with step 304. For example, the heating mode error may be based on the conditioning more error for a set of terminal units associated with heating conditions. The set of terminal units associated with heating conditions may also be determined based on the zones requesting heating, the conditioning mode setting for the terminal unit, the conditions of the space, or another method. In addition, the heating mode error may also be the aggregated conditioning mode error for a set of terminal units. As discussed above any aggregation method may be used.

As shown in FIG. 3, the process 300 may further compare the cooling mode error and the heating mode error as shown in step 308. In some examples, the process directly compares and/or aggregates all the conditioning mode errors to determine the conditioning requested by the zones. Other comparisons may also be used. Based on this comparison, the process may adjust the conditioning mode of the climate control system as shown in step 310.

To walk through these steps in more detail, the conditioning mode error may be determined in various ways at step 302. In general, the conditioning mode error is indicative of the conditioning requested by a given zone associated with a terminal unit. This conditioning mode error may further provide an indication of the difference between the conditioning requested by the terminal unit and the conditioning provided by the connected climate control device. The conditioning mode error may further provide an indication of the magnitude of this difference.

For example, a given terminal unit may service conditioned space(s) that are requesting cooling. If the connected climate control device is providing sufficient cooling for that given terminal unit then the conditioning mode error for that terminal unit may be minimal or zero. If the climate control device is not providing sufficient cooling for the terminal unit, then the conditioning mode error for the terminal unit may indication an error value. This error value may increase as the conditioning requested by the terminal unit zone increases (or continues) relative to the conditioning provided by the climate control device. The error value may decrease if the conditioning being requested and provided become more aligned.

In some instances, the conditioning requested by the terminal unit may be different that the conditioning provided by the connected climate control device. For example, the conditioned space(s) serviced by the terminal unit may request heating and the connected climate control device may be providing cooling. In these instances, the process may determine a conditioning mode error exists for the terminal unit. The conditioning mode error may also, again, indicate the magnitude of difference between the requested conditioning by the zone and the conditioning provided by the climate control device.

As discussed in more detail below the conditioning mode error may often be determined based the conditions associated with a given conditioned space and temperature setpoints associated with the space. However, in some examples, potentially where the terminal unit provides independent conditioning, e.g., a PIU providing auxiliary electric heating, the conditioning mode error may be based on other processes. For example, the conditioning mode error may be based on duration of the terminal unit is required to provide independent condition, the amount of this additional condition (e.g., heating power draw, etc.), or through other methods.

Further, at step 302, the conditioning mode error is determined for multiple terminal units connected to a given climate control device. By determining the conditioning errors for some or all of the connected terminal units, the process 300 may determine the appropriate conditioning mode to set connected climate control device and/or whether the conditioning mode should be adjusted. Again, this conditioning mode error may be determined in various ways. In some examples, the conditioning mode error for each terminal unit is representative of the temperature deviation of the conditioned space(s) serviced by a given terminal unit and the temperature setpoint for the conditioned space(s). The conditioning mode error may also be based on the duration of the temperature deviation.

As discussed further below, in some examples, the conditioning mode error for a given terminal unit may be based on an integration of the temperature deviation over the duration of time a temperature deviation is present. In these examples, the conditioning mode error may be an integrated value and there may be various advantageous associated with using this integrated value. For example, this integrated value may provide a more accurate indication of the conditions of the conditioned space(s) associated with a given terminal unit and/or the climate control system overall. In addition, using the integrated value may allow for a smoother transition between conditioning modes. There may be other advantageous as well to using the integrated value. In addition, and as also discussed below, other methods may be used to incorporate the duration of the temperature deviation into the conditioning mode error.

In some examples, a user may have the option of adjusting this process. For example, the user may have the option of allowing the system to determine the conditioning mode error using two or more processes. In these examples, the user may select between any process discussed herein or a separate process, potentially an existing process. For example, the user may select between determining the conditioning mode error using the integrated error process discussed above, e.g., where the conditioning mode error for each terminal unit is based on the temperature deviation integrated over the duration of the temperature deviation, or another potentially simpler process. In some examples, the user is allowed to select a voting process, e.g., a process where each terminal unit votes for its preferred conditioning mode. In these examples, if the user selects the voting process, then the conditioning mode of the central climate control device may be determined based on the relative number of votes for each terminal unit, which may be only based on the temperature deviation for the zone. Other options may also be selected by the user.

The temperature deviation associated with the conditioning mode error may be determined in various ways. For example, the temperature deviation may the difference between the temperature of a conditioned zone and the temperature setpoint for the zone associated with a given terminal unit. In some examples, the temperature deviation is the difference between the temperature of a given conditioned space or location, e.g., return air duct, and the temperature setpoint for that conditioned space and/or location. Any conventional process may be used to determine the temperature of the conditioned zone, space, or location, e.g., a temperature sensor, a thermostat, etc. In examples where multiple temperature sensors and/or thermostats are associated with a given zone, any conventional process may be used to determine the representative temperature for that zone, e.g., averaging, weighted average, etc.

The temperature setpoint may be the desired temperature setting for the conditioned space or zone. This value may be set by an individual, e.g., an occupant, facilities manager, technician, etc., it may be automated, e.g., set by a building automation system (BAS), etc., or set through another mechanism. In some examples, the temperature setpoint for cooling mode may be different than the temperature setpoint for heating mode. For example, a temperature setpoint of 75° F. may be used for cooling mode and a temperature setpoint of 70° F. may be used for heating mode. Other values may also be utilized. The temperature setpoint(s) may also be adjustable.

In some examples, a deadband setting may be associated with the temperature setpoint. This deadband setting may provide a temperature range associated with the temperature setpoint that is considered acceptable. For example, the deadband setting may be used to establish that a zone is "in control." If the sensed temperature for a zone exceeds the active setpoint by the deadband value then zone may be consider out of "control." The deadband setting may be any value but may typically be between 0.5° F.-5° F., and preferable between 0.5° F.-1.5° F. In some examples, the deadband setting may be set to make the overall system more stable, e.g., by providing a larger deadband setting that may limit the conditioning error for each terminal unit. Further, the deadband setting may be adjustable, potentially by user input, historical data, or other methods. In addition, similar to the temperature setpoint, this deadband setting may be set in any manner.

In some examples, the deadband setting may be used to create an adjusted setpoint temperature. For example, in cooling mode, the adjusted temperature setting may be the temperature setpoint plus the deadband setting, and in heating mode the adjusted setpoint temperature may be the reverse, e.g., the temperature setpoint minus the deadband setting. To walk through a brief example, a given terminal unit may have a temperature setpoint in cooling mode of 72° F. and a deadband setting of 2° F. In this example, the adjusted temperature setting is 74° F. In this example, a temperature of 75° F. for a conditioned space may be considered unacceptable because it is outside the adjusted temperature setpoint, e.g., 74° F. However, a temperature of 73° F. for the conditioned space may be considered acceptable, again, because it is inside the adjusted temperature setting for cooling mode.

Further, in some examples, the deadband setting, and potentially the adjusted temperature setpoint are used to determine the temperature deviation for the conditioning mode error. For example, the temperature deviation may be determined based on a comparison between the sensed temperature, e.g., the temperature of the conditioned space or location, and both the temperature setpoint as well as the adjusted temperature setpoint. If the sensed temperature is outside the adjusted temperature setpoint the temperature deviation may be given a certain value. If the sensed temperature is between the adjusted temperature setpoint and the temperature setpoint the temperature deviation may be given a certain value. And if the sensed temperature indicates that the zone does not require conditioning or does not require a conditioning rate change, e.g., the sensed temperature is less than temperature setpoint in cooling mode or greater than the temperature setpoint in heating mode, then the temperature deviation may be given a different value at that time. In some examples, the temperature deviation value may used to reset the conditioning mode error for a terminal unit. For example, if the sensed temperature is less than temperature setpoint in cooling mode or greater than the temperature setpoint in heating mode, then the conditioning error for the terminal unit may be reset, e.g., the conditioning mode error may return to a value of zero.

To illustrate this example further a terminal unit associated with cooling conditions is used. In this example, the temperature deviation is based on the sensed temperature, the temperature setpoint, the deadband setting. And, in this example, an adjusted temperature setting is also associated with the terminal unit. For this terminal unit when the sensed temperature is greater than the cooling mode temperature setpoint plus deadband, e.g., greater than the adjusted temperature setpoint, the temperature deviation value for the terminal unit is a positive value. This positive value may be equal to the difference between the space temperature and cooling setpoint plus deadband value. When the sensed temperature is greater than the cooling mode temperature setpoint, but less than the cooling mode temperature setpoint plus deadband value, e.g., between the temperature setpoint and the adjusted temperature setpoint, the temperature deviation may be a negative value. In some examples, the negative value is the difference between the adjusted temperature setpoint and the sensed temperature setpoint. Further, in some examples, when the sensed temperature is less than the cooling mode temperature setpoint, the temperature deviation may be used to adjust the conditioning mode error. For example, when the sensed temperature is less than the cooling mode temperature setpoint in cooling mode then this temperature deviation value may cause the conditioning mode error for the terminal unit to reset to zero.

In some examples, the temperature deviation for a terminal unit associated with heating conditions may be determined in a similar manner. For example, when the sensed temperature is less than the heating mode temperature setpoint minus deadband value, e.g., less than the adjusted temperature setpoint, the temperature deviation is a negative value. This value may be equal to the difference between the sensed temperature and temperature setpoint in heating mode minus deadband value. When the sensed temperature is less than the heating setpoint, but greater than the heating setpoint minus deadband value, e.g., between the adjust temperature setpoint and the temperature setpoint, the temperature deviation may be a positive. This value may be the difference between the sensed temperature and the adjusted temperature setpoint in this example. Further, when the sensed temperature is greater than the heating setpoint, the temperature deviation may be used to adjust the conditioning mode error. For example, when the sensed temperature is greater than the temperature setpoint in heating mode then this temperature deviation value may cause the conditioning mode error for the terminal unit to reset to zero.

Figure 4A:
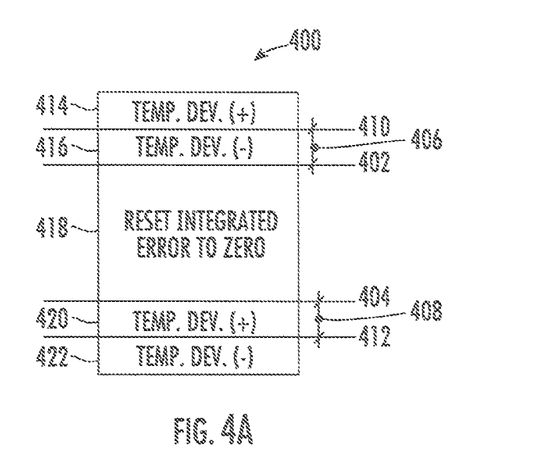
FIGS. 4A, 4B, and 4C provide diagrams illustrating temperature deviation and conditioning mode error, according to some example implementations.

FIG. 4A shows a diagram of the temperature setting for a given terminal unit 400, and provides an indication of the value associated with the temperature deviation. This diagram is representative of the temperature deviation values discussed above. This example process for determining temperature deviation may be advantageous because it allows the process to generally use the sensed temperature subtracted by the adjusted temperature value in most (if not all) instances. In addition, this process also may result in the cooling mode error being represented as a different sign than the heating mode error, which may allow these values to be compared easily.

In particular, the diagram shown in FIG. 4A shows temperature deviations for a terminal unit 400. The settings for this terminal unit include a temperature setpoint for cooling mode 402, a temperature setpoint for heating mode 404, and deadband settings for both cooling mode and heating mode, 406 and 408 respectively. Thus, in this example, the terminal unit has an adjusted temperature setpoint 410 for cooling mode and an adjusted temperature setpoint 412 for heating mode. As can be appreciated each of these values may be different, they may be adjustable, and they may be established multiple different ways.

Further, in the depicted examples, the temperature deviation is based on the temperature setpoint and the deadband setting as discussed above. To simplify the analysis for temperature deviation, FIG. 4A shows temperature region for the terminal unit, 414-422. These regions provide an indication of whether the temperature deviation would be a positive value or a negative value in a given region. In the depicted example the upper region 414 is associated with a conditioning mode error for cooling mode. This region is defined as when the sensed temperature is above the adjusted temperature setting in cooling mode, and in this example, the temperature deviation would be a positive value at that point. The next region down is an intermediate conditioning mode error region 416. Here the temperature is between the adjusted temperature setpoint and the temperature setpoint in cooling mode. In this region the temperature deviation would be a negative number. Between the cooling mode temperature setpoint and the heating mode temperature setpoint is a reset region 418. If the temperature deviation is within this region, then the conditioning mode error for the terminal unit is reset to zero. Further, in heating mode, the intermediate conditioning mode error region 420 may be the region below the temperature setpoint for heating mode and the adjusted temperature setpoint for heating mode. In this region, the temperature deviation would be a positive value in this example. The final region may be the conditioning mode error region 422 for heating mode, and this region may be where the temperature is below the adjusted temperature setpoint for heating mode. In this region the temperature deviation may be a negative value.

The above diagram and regions are merely illustrative of the values that may be assigned to the temperature deviation. This diagram may be useful to set or determine the various temperature settings for a given terminal unit. It may also be used to determine the temperature deviations for a given terminal unit. In some examples, the above regions are also useful to determine when the process should begin determining a conditioning mode error exists and/or reset the conditioning mode error. In some examples, each of these values may be adjusted based on user input or other methods.

Again, the conditioning mode error may be based on both temperature deviation and the duration of the temperature deviation. In some examples, the conditioning mode error is an integrated value, where the temperature deviation is integrated over the duration the temperature deviation is present. In some examples, the conditioning mode error is based on the rate of change of the temperature deviation over time, e.g., the first derivative of temperature deviation over time. In some examples, the conditioning mode error may be based on the acceleration of the rate of change in the temperature deviation over time, e.g., the second derivative of the temperature deviation over time. In these examples, the rate of change of change (or acceleration of the rate of change) may be indicative of large change in the thermal load being serviced by the climate control system. For example, a large room may undergo a large temperature deviation when a number of people enter, indicating that room has become a priority zone for the system. In some examples, an average value for temperature deviation is used. Other methods may also be used.

In some examples, the process 300 begins determining a conditioning mode error and/or stops determining a condition mode error at various times. For example, the adjusted temperature setpoint may be used as a setting to start determining a conditioning mode error. In these examples, once the sensed temperature is outside the adjusted temperature setting, e.g., above the adjusting temperature setting in cooling mode or below the adjusted temperature setting in heating mode, the process may begin determining the conditioning mode error. In other examples, the temperature setpoints or other values are used to begin this process. Further, in some examples, the conditioning mode error is reset if a given zone is sufficiently conditioned. For example, if the sensed temperature is within to the temperature setpoint, e.g., below the temperature setpoint in cooling mode or above the temperature setpoint in heating mode, then the conditioning mode error may be reset to zero. The adjusted temperature setpoint(s) or other values may also be used to reset the conditioning mode error.

Figure 4B:
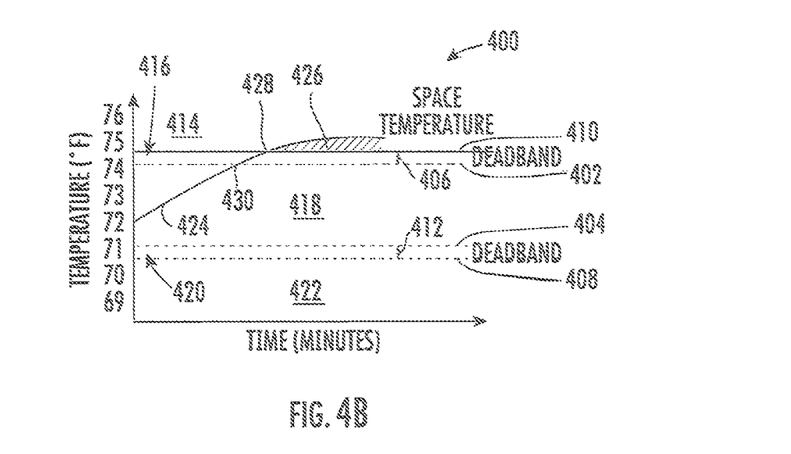
Figure 4C:
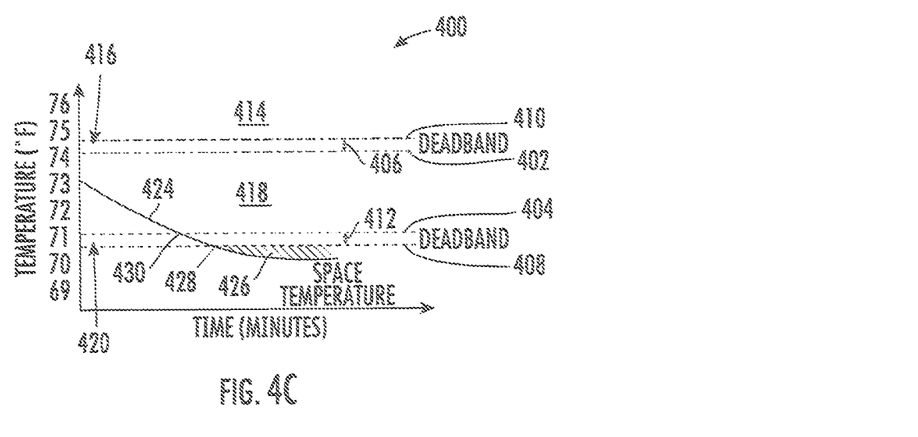

FIGS. 4B and 4C provide further illustrated examples for determining conditioning mode errors for cooling mode and heating mode, respectfully. In these examples, the conditioning mode error is determined as the integrated value of the temperature deviation. The conditioning mode error is an integrated value and determined based on the temperature deviation integrated over time (the x-axis). The sensed temperature is represented by the curve 424 in these figures and the conditioning mode error is represented by the integrated area 426. FIG. 4B shows an example where the sensed temperature is increasing, and the terminal unit is associated with cooling conditions. FIG. 4C shown an example where the sensed temperature is decreasing, and the terminal unit is associated with heating conditions.

In these depicted examples, the process may first determine the conditioning mode error once the sensed temperature is first outside of the adjusted temperature setpoint value, represented as 428 in both figures. In other examples, the process may begin determining the conditioning mode error as soon as the sensed temperature is outside of the temperature setpoint, e.g., point 430, or at another point. In these examples, once the process begins determining the conditioning mode error, the process continues to integrate that the temperature deviation over time.

As shown in FIG. 4B, once the sensed temperature is over the adjusted temperature setpoint 410 in cooling mode the process 400 begins determining the conditioning mode error. In this example, the temperature deviation is the difference between the sensed temperature 424 and 410. Again, FIG. 4A shows a simplified form of this analysis, indicating that under these conditions the terminal unit is in zone 414, and thus the temperature deviation is a positive value in this example. As the sensed temperature continues to be above the adjusted temperature setpoint, the conditioned mode error continues to increase because the value is integrated over time. If the sensed temperature begins to decrease (not shown) and drops below the adjusted temperature setpoint, e.g., into zone 416, the temperature deviation may become a negative value, which would being to reduce the conditioning mode error value. Here, because the conditioning mode error is an integrated value the conditioning mode error for this terminal unit may decrease, while remaining a positive number. In some examples, if the sensed temperature continues to decrease and drops below the temperature setpoint 410, e.g., into zone 418, then the conditioning mode error may reset to zero. In some examples, as discussed above, the conditioning mode error for a terminal unit associated with cooling conditions may only be a positive number or zero. In this example, the conditioning mode error for this terminal unit may be the integrated value at a given time. As discussed above, other methods may also be used.

FIG. 4C shows a similar example where the terminal unit 400 is associated with heating conditions. Similarly, the process may begin to determine the conditioning mode error for this terminal unit once the sensed temperature drops below the adjusted temperature setpoint 412 in heating mode. And in this example, the temperature deviation is the difference between sensed temperature 424 and 410. FIG. 4A, again, shows a simplified form of this analysis for this example, indicating that under these conditions the terminal unit is in zone 422, and thus the temperature deviation is a negative value in this example. As the sensed temperature continues to be below the adjusted temperature setpoint, the conditioned mode error continues to decrease because the value is integrated over time. If the sensed temperature begins to increase (not shown) and rise above the adjusted temperature setpoint, e.g., into zone 420, the temperature deviation may become a positive value, which would begin to increase the conditioning mode error value. Here, because the conditioning mode error is an integrated value the conditioning mode error for this terminal unit may increase while remaining a negative number. In some examples, if the sensed temperature continues to increase and rises above the temperature setpoint 412, e.g., into zone 418, then the conditioning mode error may reset to zero. In some examples, the conditioning mode error for a terminal unit associated with heating conditions may only be a negative number or zero. In this example, the conditioning mode error for this terminal unit may be the integrated value at a given time, e.g., it may be continuously updated, updated at regular intervals, etc. As discussed above, other methods may also be used.

In some examples, the conditioning mode error may be limited to a capped value. For example, the conditioning mode error may be limited to a maximum value, if a positive number is used, or limited to a minimum value if the conditioning mode error is a negative value. This may be done to limit the impact of a terminal unit may have on the overall process. In some examples, a capped value is applied to all the conditioning mode errors for the terminal units, and in other examples, different caps are applied to different terminal units. In some examples, the process applies a capped value based on historical information associated with a given terminal unit. Other methods may be used.

The methods described above may be used to determine the conditioning mode error for each of terminal units. Typically, the same method is utilized for each terminal unit, however, in some examples, different methods may be used to determine the conditioning mode error for different terminal units.

Returning to the process 300, the conditioning mode error may be used to determine the cooling mode error and the heating mode error at steps 304 and 306 respectively. Again, the cooling mode error is associated with a set of terminal units, potentially a first set of terminal units. And the cooling mode error may be the aggregated conditioning mode error for terminal units within this set.

Further, and as discussed above, the set of terminal units associated with the conditioning mode error may be the terminal units associated with cooling conditions. In some examples, all the terminal units are included in the set of terminal units used to determine the cooling mode error. In these examples, terminal units with sensed temperatures below the temperature setpoint may be given a value of zero as the conditioning mode error. In other examples, the set of terminal units may be determined in different ways, and as discussed in more detail below, in some examples, one or more terminal units is excluded from the set of terminal units considered as part of the cooling mode error.

At step 306, the heating mode error may be determined in the same manner. Again, this value may be the aggregated conditioning mode error for a set of terminal units. The set of terminal units used to determine the heating mode error may be the terminal units associated with heating conditions. Further, in examples where all the terminal units are included in the set to determine the heating mode error the terminal units with sensed temperatures above the temperature setpoints may be given a zero value for the conditioning mode error.

At step 308, the process 300 may compare the cooling mode error with the heating mode error. This comparison may be performed in various ways. In some examples, a direct comparison is made. For example, if the temperature deviation values (and corresponding conditioning mode values) use the sign values discussed above, e.g., the cooling mode value is always zero or a positive number and the heating mode value is always zero or a negative number, the process may determine compare these values by addition. If the resulting sum is positive, then the comparison indicates that there is a greater need for cooling. If the sum is negative, then the comparison indicates that there is a greater need for heating. Similarly, if the absolute value of the cooling mode error is greater than the absolute value of the heating mode error, the comparison may indicate that the need for cooling is greater than the need for heating. A reverse comparison, e.g., a greater heating mode error than cooling mode error, may similarly indicate the opposite, e.g., a greater need for heating than cooling.

In some examples, a weighted comparison is used. In these examples, the process may weight the comparison in favor of either heating or cooling. For example, the process 300 may require the cooling mode error to be greater than the heating mode error by a given value (or percentage) until the comparison provides an indication that cooling is needed. As similar value/percentage multiplier may also be applied by the heating mode. In some examples, the comparison may require the cooling mode error to be greater than the heating mode error by a given value to provide an indication that the conditioning mode should be switched from heating mode to cooling mode. The same value may be used when determining whether heating mode is sufficiently greater than the cooling mode. In other examples, this value may be different. Other process may be used to compare the heating mode error to the cooling mode error as well.

At step 310, the process 300 may adjust the conditioning mode of the central climate control system based on the comparison at step 308. Any method may be used to adjust this conditioning mode. In some examples, a time delay is used. In these examples, the process may require a certain period of time to pass in a given conditioning mode before the central climate control system adjusts the conditioning modes. This may be used to discourage or prevent the excessive switching between conditioning modes. In some examples, this time delay is only used after the central climate control system has switched between various conditioning modes multiple times, potentially multiple times within a given time span. Any period of time may be used for the time delay, but it is typically between 15-60 mins, preferably 15 mins.

In some examples, the process 300 resets the conditioning mode errors for all the terminal units once the conditioning mode for the central climate control system is switched. In other instances, the condition mode errors continue to be calculated, potentially being reset by other processes, e.g., the requested conditioning being satisfied, etc.

To walk through further examples, additional process may be used to determine or adjust the conditioning mode error for a given terminal unit. For example, the process 300 may include applying a weighting to one or more of the conditioning mode errors. This weighting may adjust the conditioning mode error for the selected terminal unit.

In some examples, the weighting is a multiplier that is applied to the conditioning mode error for one or more terminal units. In these examples, each terminal unit may have a default weighting factor of 1.0, which in these examples would not impact the conditioning mode error for the terminal units. By editing the weighting factor to a value greater than 1.0, the conditioning mode error associated a given terminal unit may be increased by that factor, and thus have a greater relative impact on the cooling mode error or the heating mode error. Similarly, by decreasing the weighting factor to a value less than 1.0, the conditioning mode error for the given unit may be decreased by that factor. Thus, in these examples, a terminal unit with a weighting factor of less than 1.0 would have a lesser relative impact on the cooling mode error or the heating mode error. In some examples, there is a maximum and/or a minimum weighting that may be applied to a terminal unit. For example, the maximum weighting a terminal unit may be set to may be 3.0, and the minimum weighting a terminal unit may be set to may be 0.1. Other methods and values may also be used to apply a weight the conditioning mode errors.

Further, various methods may be used to establish the weighting. In some examples, the weighting may be based on user input. Given the impact the weighting may have on the performance of the system overall, restrictions may be placed on these user inputs. For example, only certain user profiles may be granted access and adjust the weighting for some or all of the terminal units. Other methods may also be used to establish the weighting. For example, certain types of zones may be given a certain weighting value, e.g., a set weighting may be applied to conference rooms, common spaces, etc. In other examples, a weighting may be applied based on historical trends. For example, a given zone may consistently had a higher or lower conditioning mode error than the other average for the other zones (or other zones requesting the same type of conditioning). The process may apply a weighting to that zone to increase or decrease that conditioning mode error for the zone to be consistent with the average value of the other zones.

In some examples, the process 300 may exclude a given terminal unit from the consideration. For example, a given terminal unit may be excluded from the set of terminal units considered for the cooling mode error and/or the heating mode error. In some examples restrictions are placed on the users who may make these selections and/or the terminal units a given user may select.

In some examples, a given terminal unit may be excluded based on historical data. Similar to the above discussion regarding weighting. If one terminal unit is consistently requesting a different conditioning mode and/or the conditioning mode error is varying widely, particularly relative to the other terminal units, then the process 300 may exclude that terminal unit from consideration.

The process 300 may also exclude other terminal units for other reasons. For example, if communication is lost with one of the terminal units it may excluded. In this example, once communication is restored the terminal unit may be included again as part of the process. In some examples, if the process detects a system error, e.g., an error with the temperature sensor for one of the zones, then the affected terminal unit may be excluded.

In some examples, the process further includes displaying terminal unit information on a display. The terminal unit information may include one or more of the following a current temperature, a temperature setpoint, an adjusted temperature setpoint, and a conditioning mode error for a given terminal unit.

Figure 5:
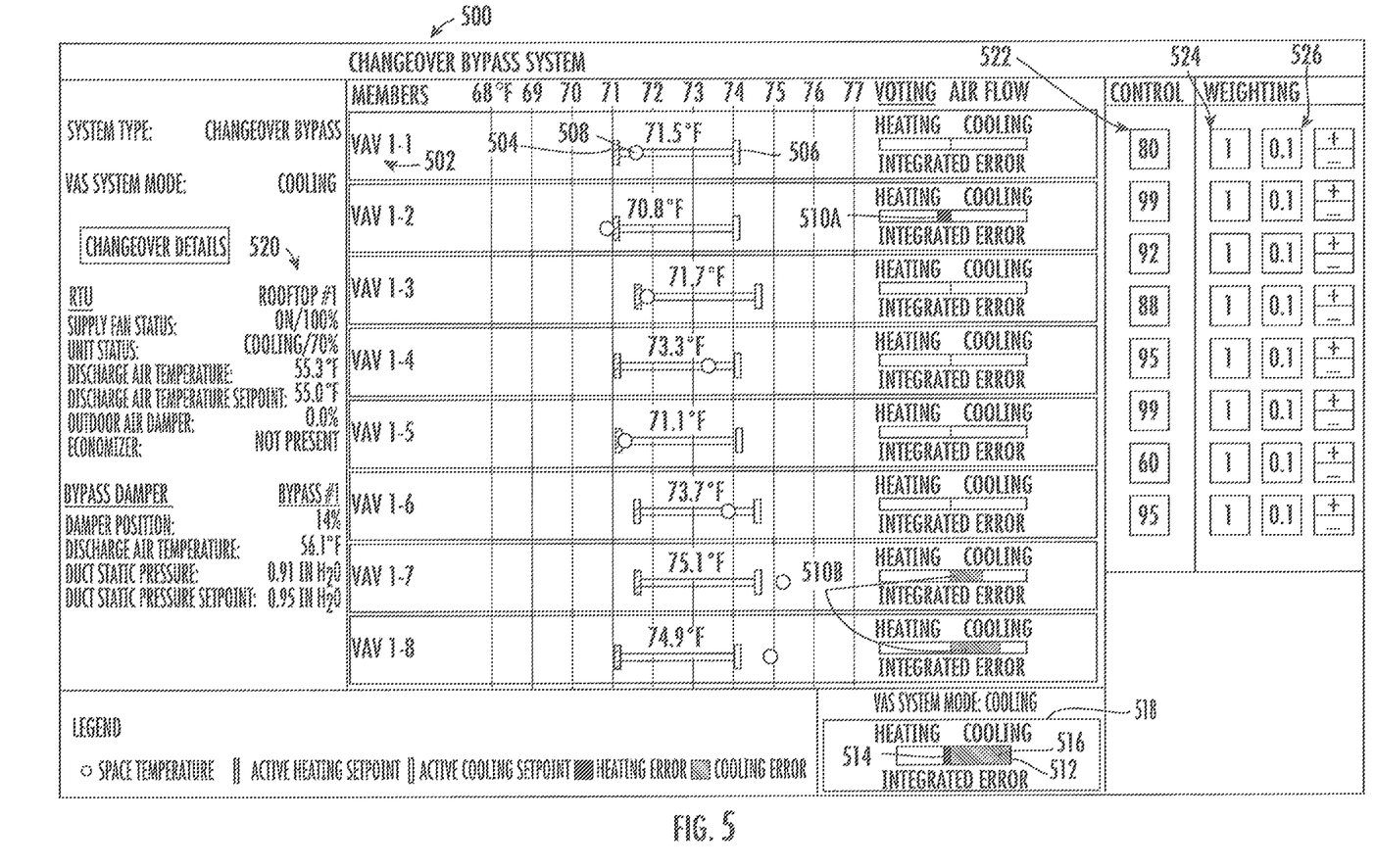
FIG. 5 provides an example display, according to some example implementations.

FIG. 5 shows an example display 500. As shown in this example, information regarding multiple terminal units 502 are shown. In this example, the terminal units are VAVs and labeled sequentially. Further in this example, each temperature setpoint 504 and 506 for the terminal units are shown. In this example all of the terminal units have both a heating mode temperature setpoint 504 and a cooling mode temperature setpoint 506. As shown in this display, each terminal unit may have different setpoints.

This display 500 also shows the sensed temperature 508 for each terminal unit 502 relative to the various temperature setpoint. Thus, in this example, the display provides an indication of which terminal units are requesting heating and which are requesting cooling. Further, this display shows an integrated conditioning mode error 510 for the terminal units. As shown in this example, only the terminal units with sensed temperatures outside the temperature setpoints have an integrated mode error, e.g., only one unit has a conditioning mode error 510A associated with heating and two units have a conditioning mode error 510B associated with cooling. These errors may be determined through any of the methods discussed above. Further, the display shows a system integrated error 512, which displays both the heating mode error 514, which includes the conditioning mode error for the one unit associated with heating 510A, and the cooling mode error 516, which includes the conditioning mode error for the two units associated with cooling 510B. This display also includes comparison window 518 that allows for these errors to be compared easily, and in this example, the comparison indications that more cooling is being requested than heating. The display 500 in this example also includes additional change over details 520 regarding the climate control system, which in this example is a rooftop unit, that may be relevant to a user.

In addition, the display 500 also includes an indication of additional information and allows for user input. For example, the display includes a control indication 522 that provides an indication of how often the zone is in "control," e.g., how often the sensed temperature for a given zone is within the deadband setting of the temperature setpoint. In the depicted example, the control indication is a percentage value or other indication. In some examples, the control indication includes the number conditioning mode errors 510 a terminal unit 502 has requested a different type of conditioning from the climate control system 520. In addition, the display includes a weighting indication 524 that displays a weighting applied to the terminal unit. Next to the weighting indication is a button 526 that allows a user to increase the weighting or decrease the weighting by a suggest adjustment weighting. In this example, the suggested adjustment weighting is consistent for all units, e.g., 0.1 plus or minus. In other examples, the suggested adjustment weighting may be more involved, e.g., based on historical data, the type of terminal unit, the type of conditioned space, etc. Further other methods may be used to allow for user input.

Figure 6:
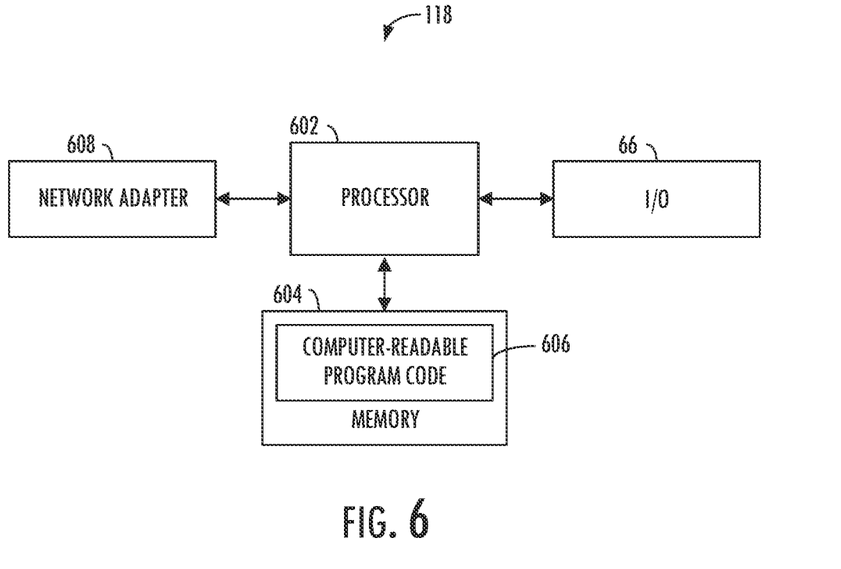
FIG. 6 illustrates control circuitry according to some example implementations.

FIG. 6 illustrates the control circuitry 118 according to some example implementations of the present disclosure. In some examples, the control circuitry may be an apparatus. The control circuitry may include one or more of each of a number of components such as, for example, a processor 602 connected to a memory 604. The processor is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor 602 may be a number of processors, a multi-core processor or some other type of processor, depending on the particular implementation.

The processor 602 may be configured to execute computer programs such as computer-readable program code 606, which may be stored onboard the processor or otherwise stored in the memory 604. In some examples, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 604 is generally any piece of computer hardware capable of storing information such as, for example, data, computer-readable program code 606 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 602, causes the control circuitry 118 to perform various operations as described herein, some of which may in turn cause the climate control system 100 to perform various operations.

In addition to the memory 604, the processor 602 may also be connected to one or more peripherals such as a network adapter 608, one or more input/output (I/O) devices 610 or the like. The network adapter is a hardware component configured to connect the control circuitry 118 to a computer network to enable the control circuitry to transmit and/or receive information via the computer network. The I/O devices may include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

As explained above and reiterated below, the present disclosure includes, without limitation, the following example implementations.

Clause 1. An apparatus for controlling a conditioning mode of a climate control device, the apparatus comprising: a memory configured to store computer-readable program code including a change-over-control-related software application; and a processor configured to access the memory, and execute the computer-readable program code to cause the apparatus to at least: determine a conditioning mode error for two or more of the plurality of terminal units, the conditioning mode error for each terminal unit being based on a temperature deviation and a duration of the temperature deviation for the respective terminal unit; determine a cooling mode error for a first set of the terminal units, the cooling mode error being based on the conditioning mode error for the terminal units associated with cooling conditions; determine a heating mode error for a second set of terminal units, the heating mode error being based on the conditioning mode error for the terminal units associated with heating conditions; compare the cooling mode error and the heating mode error; and adjust the conditioning mode of the climate control device based on the comparison of the cooling mode error and the heating mode error Clause 2. The apparatus of any of the clauses, wherein the processor configured to access the memory, and execute the computer-readable program code to determine the conditioning mode error further causes the conditioning mode error to be determined by integrating the temperature deviation over the duration of the temperature deviation for the respective terminal unit.

Clause 3. The apparatus of any of the clauses, wherein the processor configured to access the memory, and execute the computer-readable program code to determine the conditioning mode error further causes the temperature deviation to be determined based on the difference between an indoor temperature relative to an adjusted setpoint temperature, the adjusted setpoint temperature being based on a temperature setpoint and a deadband setting.

Clause 4. The apparatus of any of the clauses, wherein the processor configured to access the memory, and execute the computer-readable program code to further causes the processor to apply a weighting to one or more of the conditioning mode errors, the weighting adjusting the conditioning mode error.

Clause 5. The apparatus of any of the clauses, wherein the weighting is based on a user input.

Clause 6. The apparatus of any of the clauses, wherein the processor configured to access the memory, and execute the computer-readable program code to further causes the processor to exclude at least one of the terminal units from the first set and the second set.

Clause 7. The apparatus of any of the clauses, wherein the excluding further includes excluding the at least one of the terminal units based on user input.

Clause 8. The apparatus of any of the clauses, wherein the excluding further includes excluding the at least one of the terminal units based on historical data.

Clause 9. The apparatus of any of the clauses, wherein the processor configured to access the memory, and execute the computer-readable program code to adjusting the conditioning mode further causes the process to adjust the conditioning mode based on a time delay.

Clause 10. The apparatus of any of the clauses, wherein the processor configured to access the memory, and execute the computer-readable program code to further causes the processor to display terminal unit information on a display, the terminal unit information including one or more of the following a current temperature, a temperature setpoint, an adjusted temperature setpoint, and a conditioning mode error for a given terminal unit.

Clause 11. The apparatus of any of the clauses, wherein the processor configured to access the memory, and execute the computer-readable program code to display terminal unit information further causes the processor to display a weighting for the terminal unit and a weighting adjustment, the weighting adjustment providing a suggested adjustment weighting for the terminal unit.

Clause 12. A method of controlling a conditioning mode of a climate control device, the climate control device providing a conditioning fluid to a plurality of terminal units, the method comprising: determining a conditioning mode error for two or more of the plurality of terminal units, the conditioning mode error for each terminal unit being based on a temperature deviation and a duration of the temperature deviation for the respective terminal unit; determining a cooling mode error for a first set of the terminal units, the cooling mode error being based on the conditioning mode error for the terminal units request cooling; determining a heating mode error for a second set of terminal units, the heating mode error being based on the conditioning mode error for the terminal units requesting heating; comparing the cooling mode error and the heating mode error; and adjusting the conditioning mode of the climate control device based on the comparison of the cooling mode error and the heating mode error.

Clause 13. The method of any of the clauses, wherein the conditioning mode error is determined by integrating the temperature deviation over the duration of the temperature deviation for the respective terminal unit.

Clause 14. The method of any of the clauses, wherein the temperature deviation is determined based on the difference between an indoor temperature relative to an adjusted setpoint temperature, the adjusted setpoint temperature being based on a temperature setpoint and a deadband setting.

Clause 15. The method of any of the clauses, wherein a weighting is applied to one or more of the conditioning mode errors, the weighting adjusting the conditioning mode error.

Clause 16. The method of any of the clauses, wherein the weighting is based on a user input.

Clause 17. The method of any of the clauses, further comprising excluding at least one of the terminal units from the first set and the second set.

Clause 18. The method of any of the clauses, wherein the excluding further includes excluding the at least one of the terminal units based on user input.

Clause 19. The method of any of the clauses, wherein the excluding further includes excluding the at least one of the terminal units based on historical data.

Clause 20. The method of any of the clauses, wherein adjusting the conditioning mode of the climate control system further includes adjusting the conditioning mode based on a time delay.

Clause 21. The method of any of the clauses, further comprising displaying terminal unit information on a display, the terminal unit information including one or more of the following a current temperature, a temperature setpoint, an adjusted temperature setpoint, and a conditioning mode error for a given terminal unit.

Clause 22. The method of any of the clauses, wherein displaying terminal unit information further includes displaying a weighting for the terminal unit and a weighting adjustment, the weighting adjustment providing a suggested adjustment weighting for the terminal unit.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for controlling a conditioning mode of a climate control device, the apparatus comprising:
   a memory configured to store computer-readable program code including a change-over-control-related software application; and
   a processor configured to access the memory, and execute the computer-readable program code to cause the apparatus to at least:
      determine a conditioning mode error for each of two or more of a plurality of terminal units, the conditioning mode error for each terminal unit being based on a temperature deviation and a duration of the temperature deviation for the respective terminal unit;
      determine a cooling mode error for a first set of the terminal units, the cooling mode error being based on the conditioning mode error for each of the terminal units associated with cooling conditions;
      determine a heating mode error for a second set of terminal units, the heating mode error being based on the conditioning mode error for each of the terminal units associated with heating conditions;
      compare the cooling mode error and the heating mode error, wherein comparison of the cooling mode error and the heating mode error is based on two or more of the plurality of terminal units; and
      adjust the conditioning mode of the climate control device based on the comparison of the cooling mode error and the heating mode error.

2. The apparatus of claim 1, wherein the processor configured to access the memory, and execute the computer-readable program code to determine the conditioning mode error further causes the conditioning mode error to be determined by integrating the temperature deviation over the duration of the temperature deviation for the respective terminal unit.

3. The apparatus of claim 1, wherein the processor configured to access the memory, and execute the computer-readable program code to determine the conditioning mode error further causes the temperature deviation to be determined based on the difference between an indoor temperature relative to an adjusted setpoint temperature, the adjusted setpoint temperature being based on a temperature setpoint and a deadband setting, wherein the indoor temperature is determined using a temperature sensor.

4. The apparatus of claim 1, wherein the processor configured to access the memory, and execute the computer-readable program code to further causes the processor to apply a weighting to one or more of the conditioning mode errors, the weighting adjusting the conditioning mode error.

5. The apparatus of claim 4, wherein the weighting is based on a user input.

6. The apparatus of claim 1, wherein the processor configured to access the memory, and execute the computer-readable program code to further causes the processor to exclude at least one of the terminal units from the first set and the second set.

7. The apparatus of claim 6, wherein the excluding further includes excluding the at least one of the terminal units based on user input.

8. The apparatus of claim 6, wherein the excluding further includes excluding the at least one of the terminal units based on historical data.

9. The apparatus of claim 1, wherein the processor configured to access the memory, and execute the computer-readable program code to adjusting the conditioning mode further causes the process to adjust the conditioning mode based on a time delay.

10. The apparatus of claim 1, wherein the processor configured to access the memory, and execute the computer-readable program code to further causes the processor to display terminal unit information on a display, the terminal unit information including one or more of the following a current temperature, a temperature setpoint, an adjusted temperature setpoint, and a conditioning mode error for a given terminal unit.

11. The apparatus of claim 10, wherein the processor configured to access the memory, and execute the computer-readable program code to display terminal unit information further causes the processor to display a weighting for the terminal unit and a weighting adjustment, the weighting adjustment providing a suggested adjustment weighting for the terminal unit.

12. A method of controlling a conditioning mode of a climate control device, the climate control device providing a conditioning fluid to a plurality of terminal units, the method comprising:
   determining a conditioning mode error for each of two or more of a plurality of terminal units, the conditioning mode error for each terminal unit being based on a temperature deviation and a duration of the temperature deviation for the respective terminal unit;
   determining a cooling mode error for a first set of the terminal units, the cooling mode error being based on the conditioning mode error for each of the terminal units request cooling;
   determining a heating mode error for a second set of terminal units, the heating mode error being based on the conditioning mode error for each of the terminal units requesting heating;
   comparing the cooling mode error and the heating mode error, wherein comparison of the cooling mode error and the heating mode error is based on two or more of the plurality of terminal units; and
   adjusting the conditioning mode of the climate control device based on the comparison of the cooling mode error and the heating mode error.

13. The method of claim 12, wherein the conditioning mode error is determined by integrating the temperature deviation over the duration of the temperature deviation for the respective terminal unit.

14. The method of claim 12, wherein the temperature deviation is determined based on the difference between an indoor temperature relative to an adjusted setpoint temperature, the adjusted setpoint temperature being based on a temperature setpoint and a deadband setting,
wherein the indoor temperature is determined using a temperature sensor.

15. The method of claim 12, wherein a weighting is applied to one or more of the conditioning mode errors, the weighting adjusting the conditioning mode error.

16. The method of claim 15, wherein the weighting is based on a user input.

17. The method of claim 12, further comprising excluding at least one of the terminal units from the first set and the second set.

18. The method of claim 17, wherein the excluding further includes excluding the at least one of the terminal units based on user input.

19. The method of claim 17, wherein the excluding further includes excluding the at least one of the terminal units based on historical data.

20. The method of claim 12, wherein adjusting the conditioning mode of the climate control system further includes adjusting the conditioning mode based on a time delay.

21. The method of claim 12, further comprising displaying terminal unit information on a display, the terminal unit information including one or more of the following a current temperature, a temperature setpoint, an adjusted temperature setpoint, and a conditioning mode error for a given terminal unit.

22. The method of claim 21, wherein displaying terminal unit information further includes displaying a weighting for the terminal unit and a weighting adjustment, the weighting adjustment providing a suggested adjustment weighting for the terminal unit.

23. A non-transitory computer-readable storage medium having executable instructions to cause one or more processors to perform a method to control a conditioning mode of a climate control device, the climate control device providing a conditioning fluid to a plurality of terminal units, the method comprising:
   determining a conditioning mode error for each of two or more of a plurality of terminal units, the conditioning mode error for each terminal unit being based on a temperature deviation and a duration of the temperature deviation for the respective terminal unit;
   determining a cooling mode error for a first set of the terminal units, the cooling mode error being based on the conditioning mode error for each of the terminal units request cooling;
   determining a heating mode error for a second set of terminal units, the heating mode error being based on the conditioning mode error for each of the terminal units requesting heating;
   comparing the cooling mode error and the heating mode error, wherein comparison of the cooling mode error and the heating mode error is based on two or more of the plurality of terminal units; and
   adjusting the conditioning mode of the climate control device based on the comparison of the cooling mode error and the heating mode error.

24. The non-transitory computer-readable storage medium of claim 23, wherein the conditioning mode error is determined by integrating the temperature deviation over the duration of the temperature deviation for the respective terminal unit.

25. The non-transitory computer-readable storage medium of claim 23, wherein the temperature deviation is determined based on the difference between an indoor temperature relative to an adjusted setpoint temperature, the adjusted setpoint temperature being based on a temperature setpoint and a deadband setting,
wherein the indoor temperature is determined using a temperature sensor.

26. The non-transitory computer-readable storage medium of claim 23, wherein a weighting is applied to one or more of the conditioning mode errors, the weighting adjusting the conditioning mode error.

* * * * *